Patented Oct. 20, 1953

2,656,322

UNITED STATES PATENT OFFICE 2,656,322

CATALYST AND METHOD OF PREPARING SAME

Jack F. Eberle, Bartlesville, Okla., assignor to Phillips Petroleum Company, a corporation of Delaware No Drawing. Application January 4, 1949, Serial No. 69,112

22 Claims. (Cl. 252—435)

This invention relates to novel catalysts and to methods of preparing the same. In one embodiment the invention relates to the removal of organically combined fluorine from hydrocarbon or other organic material. In a more specific embodiment, it relates to the removal of organically combined fluorine from a hydrocarbon effluent of an alkylation process in which a fluorine-containing catalyst is employed. In one aspect the invention relates to the conversion of organic fluorine compounds to hydrogen fluoride and the corresponding organic residue. The invention further relates to the recovery of hydrogen fluoride liberated by such reaction.

This application is a continuation-in-part of my copending application Serial No. 694,130, filed August 30, 1946, now abandoned.

In the manufacture of hydrocarbons by processes in which a fluorine-containing catalyst is used, small proportions of organic fluorine-containing by-products are formed. These processes may involve such reactions as polymerization, isomerization and alkylation of relatively low-boiling hydrocarbons to produce motor fuel having a high octane rating, and are effected in the presence of catalysts comprising one or more of such inorganic fluorine compounds as hydrofluoric acid, boron trifluoride and the like. Although the exact nature or composition of these organic fluorine-containing by-products has not been definitely established, they are believed to be predominately alkyl fluorides and/or aryl fluorides. These fluorides are not completely removed by washing the hydrocarbon mixtures in which they are contained with alkaline solutions such as aqueous solutions of sodium hydroxide or sodium carbonate. For the most part, these organic fluorine compounds have boiling points which are not substantially higher than the several reactants used in the conversion process. However, some of the organic fluorine compounds do have higher boiling points than the reactants and the boiling points of the higher-boiling fluorides correspond to the boiling points of the conversion products. As a result, these organic fluorine compounds will be found in the various hydrocarbon fractions in subsequent separation processes for separating and refining the products, and in many instances the organic fluorine compounds tend to accumulate in the high-boiling hydrocarbon fractions. These fluorides tend to decompose at elevated temperatures, such as those employed in fractional distillation of the hydrocarbon mixture, thereby forming hydrofluoric acid which is corrosive, especially in the presence of moisture. In gaseous mixtures of hydrocarbons they may thus cause corrosion of treating equipment in liquid hydrocarbon mixtures, and especially motor fuels, they are undesirable for similar reasons that are obvious and because they reduce the antiknock value of the fuel.

Consequently, it is highly desirable and often essential to minimize the accumulation of the organic fluorine compounds, or to remove them from the hydrocarbon effluent of such processes as described. Various methods have been used to remove the organic fluorine compounds from the hydrocarbon effluent. For example, in the alkylation of low-boiling paraffins in the presence of a hydrofluoric acid alkylation catalyst the alkylation effluent is passed to a separator wherein a liquid hydrocarbon-rich phase and a liquid hydrogen fluoride-rich phase are formed. The liquid hydrocarbon-rich phase is passed from the separator to a distillation column wherein dissolved hydrogen fluoride is removed as an overhead azeotropic mixture with light hydrocarbons. The bottom fraction contains the alkylate product and also minor proportions of organic fluorine compounds which are undesirable as previously mentioned. In the usual practice the bottom fraction from this distillation is treated to remove the organic fluorine compounds. Such treatments comprise contacting the bottom fraction with a suitable sorption material which selectively sorbs the organic fluorine compounds, or contacting the bottom fraction with a catalytic dehydrofluorination agent which converts the organic fluorine compound to hydrogen fluoride and the corresponding organic radical. Sorption materials which have been used to sorb organic fluorine compounds include those known to be catalytically active for hydrogenation and dehydrogenation reactions, such as activated alumina or bauxite. Catalytic dehydrofluorination agents which are suitable for converting the organic fluorine compounds include various fluorides of metals and compounds resulting from treatment of oxides of various metals with hydrogen fluoride. Various other treatments which involve the use of catalytic agents have been used in removing the organic fluorine compounds rendering the hydrocarbon fraction substantially non-corrosive.

In all these treatments it is very difficult, if not impossible, to remove absolutely or even substantially all of the organic fluorine compounds, because in the case of sorbents the sorption power decreases and in the case of catalysts the equilibrium of the decomposition reaction must be considered. As a result of some of the fluorine compounds, especially the high-boiling organic fluorine compounds, remaining in the hydrocarbon fraction, the hydrocarbon stream becomes corrosive as a result of the accumulation of the organic fluorine compounds in the bottom fractions from various fractional distillations subsequent to the conventional organic fluorine compound-removal process. Therefore, it is much to be desired to provide a method for removing substantially all of the organic fluorine compounds from the hydrocarbon stream in order to prevent corrosion of subsequent equipment by concentration of the organic fluorine compounds in the bottom fractions in the various fractional distillations.

Moreover, since the fluorine combined as the organic fluoride represents over a period of time, a substantial loss of hydrofluoric acid catalyst in a conversion process such as alkylation, the recovery of the fluorine as hydrogen fluoride would amount to a substantial saving in costs of operation and material.

There are other known processes in which gaseous or liquid materials containing minor amounts of organic fluorine compounds are found, and the present invention may be applied to the treatment of such materials or streams. As examples may be mentioned the deliberate formation of organic fluorine compounds, particularly the low-boiling aliphatic fluorine compounds which are formed by reacting hydrocarbons or chlorinated hydrocarbons with elementary fluorine or hydrogen fluoride under selected conditions. Certain product and residual streams in such processes may carry organically combined fluorine in amounts ranging usually from something less than 50 per cent down to traces.

An object of this invention is to provide a new and improved defluorination catalyst.

Another object is to provide a catalyst useful in effecting various organic conversions.

A further object of the invention is to provide a novel method for the preparation of catalysts.

It is a further object to increase the efficiency of a dehydrofluorination catalyst for the removal of organic fluorine compounds from a hydrocarbon effluent of a hydrocarbon conversion process.

Further objects and advantages of the invention will be apparent to one skilled in the art, from the accompanying disclosure and discussion.

In accordance with certain aspects of this invention, fluorine compounds can be substantially removed from a fluid mixture containing the same by contacting the fluid mixture with a novel catalytic agent which decomposes the fluorine compound to liberate hydrogen fluoride and with a suitable sorption medium which is capable of sorbing the liberated hydrogen fluoride. In contacting an organic mixture containing an organic fluorine compound with a catalytic agent according to one embodiment of this invention, the organic fluorine compound is decomposed into hydrogen fluoride and the corresponding organic radical. The decomposition of the organic fluorine compound is an equilibrium reaction, as evidenced by the following typical reaction equation:

Alkyl fluoride⇌Olefin+HF

Once such an equilibrium is established in the presence of a catalyst no further decomposition of the organic fluorine compound takes place unless one of the products of decomposition is removed, such as the olefin or the hydrogen fluoride. If one or both of the decomposition products are removed, the decomposition reaction of the organic fluorine compound will proceed toward completion and thus decompose substantially all of the organic fluorine compound. Consequently, the organic mixture containing the organic fluorine compound is contacted either simultaneously or alternately with the novel catalytic defluorination agent of the invention and with a suitable sorption medium. The removal of the hydrogen fluoride by the sorption medium upsets the decomposition equilibrium and permits further catalytic decomposition of the organic fluorine compound.

I have found that catalysts effective for dehydrofluorinations and other conversions, having unusually high activity and long life, are obtained if certain metals (if necessary having a coating of metal compound reactible with acid) are treated with a strong inorganic oxygen-containing acid whose anhydride is relatively non-volatile, particularly phosphoric acid, preferably followed by heating the resulting material at elevated temperatures. The preferred metal is aluminum; cadmium, zinc, and copper may, however, be used if desired, with especially good results. Any of the metals from magnesium to silver, both inclusive, in the Electromotive Force Series of Elements as compiled by Giles B. Cooke, Handbook of Chemistry and Physics, Chemical Rubber Publishing Co., 30th edition (1947), page 1439, may be employed. The preferred group of metals is composed of those from aluminum to trivalent iron, both inclusive, all of which are above $H_2$, in said Electromotive Force Series, viz. Al, Be, U, Mn, Zn, Cr, Ga, Cd, In, Tl, Co, Ni, Sn, Pb, and Fe. However, the metals mentioned specifically hereinabove, viz. aluminum, cadmium, zinc and copper, are preferred. Of course the elements Te, S, $H_2$, As, $O_2$, and $I_2$ appearing within the named groups in said series are not included in the scope of this invention, being non-metals. The treated metals are preferably used in a relatively fine state of division, such as shot, shavings, filings, short pieces of wire, powder, etc. In case powdered material is used it is suspended in the liquid or gaseous hydrocarbon material to be treated, in accordance with techniques analogous to those utilized in the art of "fluid" catalytic cracking. Furthermore, mixtures of two or more metals as disclosed in my copending application Serial No. 637,169 filed December 26, 1945, which matured to U. S. Patent 2,481,208 on September 6, 1949, may be treated with phosphoric or other acid of the class described and employed in accordance with the invention. The phosphoric acid used in treating the metal or metals preferably has an acidity ($H_3PO_4$) of at least 75 per cent, and more desirably, approximately 85 per cent. Other suitable acids are the various oxygen-containing acids of phosphorus, for instance metaphosphoric or phosphorous acids; also, chromic acid and tungstic acid may be employed.

In accordance with a preferred embodiment of the invention, the catalyst is prepared by immersing the metal in orthophosphoric acid or by otherwise treating the metal with the acid, for example spraying the acid on the metal. After the initial liberation of hydrogen has substantially ceased, the metal together with the material deposited thereon is separated from any excess acid without washing. Preferably the thus-treated material is next heated at elevated temperatures, for example 500 to 700° F., for a period of time which may conveniently range from 0.5 to 2 hours. Separation from excess acid without washing inherently or unavoidably leaves unreacted acid on the coated metal which is present during the calcination step. After adjustment of the particle size to the desired value, which is frequently about 5 to 15 mesh, the catalyst is ready for use. This catalyst is probably composed of the free metal, the metal phosphate in the form of pyrophosphate, and $P_2O_5$.

In reacting the metal with the acid, magnesium will be found so active that it is difficult to stop the reaction and retain some free metal. The metals below hydrogen in the electromotive force series do not react directly with the acid, hence a pre-treatment of same to form a coating reactive with acid is required. This usually comprises treatment with an oxidizing agent. For example, hot chlorine gas will oxidize the metal surface and form the chloride, which is readily reactive with phosphoric acid and the like. Either free oxygen, preferably in the form of air, or a nitrogen oxide compound such as heated $NO_2$ or $HNO_3$ vapor, is suitable, giving the metal oxide, or sometimes the nitrate, as coating. The thus-treated particles of metal are then reacted with one of the strong inorganic oxygen-containing acids having a non-volatile anhydride and the treatment continued as described to form the finished catalyst. Silver metal usually requires a catalyst or intermediate compound formation for conversion to the oxidized form; thus, silver may be treated with oxygen in the presence of a peroxide, or with hydrogen sulfide to form silver sulfide followed by oxygen treatment to form the oxide. Certain metals above hydrogen in the electromotive force series, especially cadmium and lead react with oxygen-containing acids only very slowly, and this reaction may be accelerated to practical rate by adding a trace of another metal, such as copper or copper sulfate or a metal such as platinum or other metal to set up a galvanic cell. After visible evolution of hydrogen ceases the excess acid is drained and the material calcined as described above.

Other catalysts are prepared by effecting admixture of the metal directly with the acid anhydride, with or without the salt of the metal and acid. For example, phosphorus pentoxide is sublimed onto particles of spongy zinc. As another example, chromic acid is mixed with iron chromate, the mixture calcined and powdered and admixed with powdered iron metal.

In the preferred embodiment of the present invention, an organic mixture containing an organic fluorine compound is passed, in either the liquid or vapor phase, through a treating zone containing both a powdered or a granular catalytic defluorination material and a hydrogen fluoride-sorption medium. This treating zone is usually arranged in such a manner that the catalyst and the sorption medium are in alternate layers. By such an arrangement the first catalytic layer establishes a decomposition equilibrium reaction and the subsequent sorption layer upsets this equilibrium by removing liberated hydrogen fluoride; then the next catalytic layer reestablishes the decomposition equilibrium by decomposing at least a portion of the remaining organic fluorine compound. Each following catalytic and sorption layer acts in a similar manner until substantially all of the organic fluorine compound is decomposed.

Another embodiment, which may also be practiced, is the arrangement of the catalyst and sorption medium in successive zones rather than in a single zone; thus, the catalyst will be maintained in one separate zone or column and the sorption medium will be maintained in a second and successive zone or column, through which the organic mixture passes, respectively. Still another arrangement may be followed by supporting alternate layers of catalyst and sorption medium in a sorption column in such a manner that free space exists between the supported layers. This arrangement is especially desirable since the tendency for channelling of a liquid hydrocarbon stream through the powdered or granular contact material is minimized. The number of layers or zones which will be suitable for removal of the organic fluorine compound depends upon several factors such as the type of catalytic material, the type of sorption medium, the conditions of temperature and pressure, and the depth of the catalytic and sorption beds; but such conditions and the number of successive layers or zones may be easily determined by trial. In general, it will be sufficient to use layers of catalyst and of sorption material about 3 to 6 inches in depth when from about 10 to about 25 total layers are used in the treating zone.

In a somewhat less preferred embodiment of the present invention the catalyst and sorption medium may be admixed together in a treating zone in a more or less uniform manner and the organic mixture contacted with the uniform mixture of catalyst and sorption medium. The arrangement of alternate layers of separate zones for each contact material is preferred in order to facilitate recovery of the sorbed hydrogen fluoride, if desired, and also since the contact of liberated hydrogen fluoride with the catalyst may substantially decrease the catalytic activity thereof by the conversion of the hydrogen fluoride to the corresponding metallic fluoride. Such conversion to the metallic fluoride consumes both the catalyst and the hydrogen fluoride so as to decrease the activity of the catalyst and hinder the recovery of hydrogen fluoride, although in some cases the metal fluoride will be catalytically active for dehydrofluorination.

The acid-treated metals of the present invention are particularly adaptable to the process disclosed herein in which a fluid containing fluorine compounds is contacted alternately or simultaneously with a defluorination agent and with a hydrogen fluoride sorption material, inasmuch as the acid-treated metal quickly establishes the decomposition equilibrium of the fluorine compounds due to its exceptionally high catalytic activity for the dehydrofluorination reaction.

Sorption materials which have been found suitable for selectively sorbing hydrogen fluoride from an organic mixture have been found to comprise charcoal, dehydrated bauxite, granular metal oxides such as alumina, chromium oxide, and dehydrated metal oxide gels and the like. Materials which are capable of sorbing hydrogen fluoride and which involve a chemical reaction to form a decomposable salt are especially desirable. Such sorbent materials may comprise fluorides of the alkali and alkali earth metals, such as sodium fluoride or potassium fluoride, which form the addition compound of the type $NaF \cdot HF$. If desired, the hydrogen fluoride may be recovered from the double salt by heating directly or by passing hot gases over the sorption medium. Nitrogen bases and metal salts that form acid fluorides are also suitable for sorption of the liberated hydrogen fluoride.

Obviously both the catalyst and sorption medium may be supported on various inert materials well known to those skilled in the art without departing from the scope of this invention.

In practicing the preferred embodiment of this invention for the removal of organic fluorine compounds from a predominately hydrocarbon mixture, the temperature of the treating zone is from about 70 to about 400° F. or higher, preferably about 175 to about 350° F., and the pressure is from about 100 to about 600 pounds per square inch gage, preferably from about 200 to about 450 pounds per square inch gage. A suitable space velocity in liquid volumes of organic mixture per volume of catalyst per hour is from about 0.5 to about 10, and preferably from about 2 to about 5. As previously described, if the catalyst and sorption medium are arranged in layers, the thickness of the layers may be from about 3 to about 6 inches and the number of layers may be about 10 to about 25; the actual thickness and number of layers will depend upon the conditions of operation and upon the particular catalyst and sorption medium used. Such conditions set forth above are not limiting to the scope of this invention, but are those which have been found preferable in general for removing substantially all of the organic fluorine compounds from the hydrocarbon mixture without effecting extensive chemical changes in the hydrocarbons themselves. Various other conditions may be found appropriate by trial.

In the case where the catalytic agent and the sorption medium are in separate zones or columns somewhat different conditions of temperature, pressure, etc. may be used for each column during defluorination. Thus, relatively high temperatures and low pressures may be used in the catalyst zone, while relatively low temperatures and high pressures may be used in the sorption zone. However, due to economic reasons it may be more desirable to maintain substantially the same conditions in both the catalytic and sorption zones.

It is preferred that the hydrocarbon material subjected to treatment in accordance with this invention contain not substantially more and preferably substantially less than 0.005 weight per cent free hydrofluoric acid when first charged into contact with the catalyst.

The sorbed hydrogen fluoride is recovered from the sorption medium and the sorption medium regenerated by direct heating or passing hot gases, such as air, steam, hydrocarbons, etc., through the treating zone. The heating process not only regenerates the sorption medium, but also may activate the catalytic defluorination agent when the sorption medium and catalytic agent are contained in the same zone. In case the sorption medium is a non-reactive material which sorbs the liberated hydrogen fluoride, such as charcoal, this material may be regenerated by passing superheated steam or other hot gases, such as butane, at a temperature from about 400 to about 800° F., preferably about 500 to 600° F., and at approximately atmospheric pressure through or in contact with the sorption medium. When a material, such as sodium or potassium fluoride, which forms an additive compound with the liberated hydrogen fluoride, is used as the sorption medium, the temperature of the regenerating gas, such as air, steam, butane, etc., is from about 500 to about 1000° F., preferably from about 600 to about 700° F., and the pressure is approximately atmospheric. It may be preferred to operate the regeneration cycle at the same pressure as the sorption cycle, and thus the use of elevated pressure for regeneration is within the scope of this invention. Regeneration of the sorption medium may be accomplished also by heating the sorption medium directly without passing a hot gas through the medium. Upon heating the sorption medium during regeneration, whether by direct means or by the use of hot gases, vaporous hydrogen fluoride is liberated which may be recovered by methods familiar to those skilled in the art. In particular, when a regenerating gas, such as butane, is used, the hydrogen fluoride may be recovered from the resulting gaseous mixture by condensing the gaseous mixture and fractionally distilling the condensate to recover the hydrogen fluoride.

Although this invention can be applied with advantage in many modifications to the removal of either organic or inorganic fluorine compounds from both organic and inorganic fluid mixtures, particular benefits of it have been realized in connection with the alkylation of low-boiling isoparaffins with low-boiling olefins in the presence of a fluorine-containing alkylation catalyst. The manner of conducting defluorination and/or dehydrofluorination reactions in the presence of the instant catalyst may be similar to the methods set forth in U. S. Patent 2,481,208 referred to above.

The following examples illustrate the operability of the present invention and also show the effectiveness of the preferred defluorination catalyst for use in this invention.

EXAMPLE I

Aluminum shavings about 0.005 inch thick were placed in a beaker and covered with 85 per cent orthophosphoric acid. When evolution of hydrogen had apparently ceased, the solid material was removed from the beaker, and the particles were broken to approximately the size of the original shavings. The solid material was then placed in an electrically heated steel tube in which it was slowly heated to 625° F. and maintained at this temperature for one hour. It was then removed, cooled, and reduced to a particle size sufficiently small to pass an 8-mesh screen.

Dehydrofluorination data obtained by the use of this catalyst are given in Example II.

EXAMPLE II

Hydrogen fluoride-free hydrocarbon effluent from a hydrofluoric acid alkylation unit, in which isobutane was alkylated with butylenes, was contacted at 250° F. and 400 p. s. i. in a continuous flow system with the catalyst prepared as described in Example I. The data obtained are given in Table I.

Table I
DEHYDROFLUORINATION WITH PHOSPHORIC ACID-TREATED ALUMINUM

| Cumulative Time, Hour | Cumulative Vol. Treated/ Vol. Catalyst | Space Velocity, liq. vol./vol. catalyst/hr. | F Compounds, wt. percent | | | | F removed, percent |
|---|---|---|---|---|---|---|---|
| | | | Before Treatment | | After Treatment | | |
| | | | Org. F | HF | Org. F | HF | |
| 51 | 186 | 4.1 | 0.0318 | 0.0000 | 0.0009 | 0.0014 | 97 |
| 167 | 455 | 4.1 | 0.0265 | 0.0000 | 0.0059 | 0.0056 | 78 |
| 220 | 600 | 1.9 | 0.0288 | 0.0032 | 0.0067 | 0.0193 | 77 |
| 339 | 781 | 3.5 | 0.0227 | 0.0051 | 0.0069 | 0.0141 | 70 |
| 523 | 1,180 | 1.8 | 0.0184 | 0.0003 | 0.0070 | 0.0090 | 62 |
| 592 | 1,345 | 3.0 | 0.0209 | 0.0000 | 0.0078 | 0.0096 | 63 |

EXAMPLE III

A similar hydrocarbon material was contacted at 212° F. and 250 p. s. i. in the same flow system, with aluminum shavings, the surface of which had been etched with dilute hydrochloric acid and washed free of acid. The data obtained are given in Table II.

Table II
DEHYDROFLUORINATION WITH ETCHED ALUMINUM

| Cumulative Time, Hour | Cumulative Vol. Treated/ Vol. Catalyst | Space Velocity, liq. vol./vol. catalyst/hr. | F Wt. percent | | | | R removed, percent |
|---|---|---|---|---|---|---|---|
| | | | Before Treatment | | After Treatment | | |
| | | | Org. F | HF | Org. F | HF | |
| 19 | 39 | 2.3 | 0.0156 | 0.0000 | 0.0070 | 0.0029 | 55 |
| 93 | 211 | 2.5 | 0.0156 | 0.0000 | 0.0085 | 0.0026 | 46 |
| 192 | 497 | 1.1 | 0.0352 | 0.0000 | 0.0270 | 0.0065 | 23 |
| 271 | 741 | 7.5 | 0.0339 | 0.0000 | 0.0245 | 0.0057 | 27 |
| 339 | 1,175 | 6.5 | 0.0390 | 0.0000 | 0.0300 | 0.0095 | 23 |
| 363 | 1,340 | 6.0 | 0.0390 | 0.0000 | 0.0325 | 0.0088 | 17 |

Comparison of the data in Tables I and II clearly shows the superiority of phosphoric acid-treated aluminum as a catalyst for removal of organic fluorine. The etched aluminum, after treatment of 1340 volumes of hydrocarbon containing organic fluorine, removed only 17 per cent of the organic fluorine, whereas, after treatment of 1345 volumes, the phosphoric acid-treated aluminum removed 63 per cent. It will also be noted that at the end of each run the etched aluminum metal had only a little less than a third of its original activity, that is it was removing 17 per cent fluorine, whereas at the start it removed 55 per cent fluorine, while the phosphoric acid-treated aluminum metal retained sixty per cent of its original activity. Further comparison shows that in the case of the phosphoric acid-treated catalyst, after treatment of 455 volumes of feed at 4.1 space velocity, the fluorine removal was 78 per cent, whereas in the case of the HCl-etched aluminum after treatment of 497 volumes of feed at 1.1 to 2.5 space velocity the latter catalyst was removing only about 23 per cent of the organic fluorine.

Although the data shown in Table II were obtained at 212° F., whereas the data presented in Table I were obtained at 250° F., experience has shown that an increase of temperature from 212 to 250° F. does not give a significant increase in fluorine removal. Therefore the temperatures of the two runs which are compared are of the same order insofar as the effect on rapidity and extent of fluorine removal are concerned. This is further borne out in Example IV. Likewise, the lower pressure employed in Example III as compared with that in Example II did not significantly affect the result.

EXAMPLE IV

Fluorine-containing hydrocarbon alkylation effluent similar to those treated in Examples II and III was contacted at 250° F. and 400 p. s. i. in the same equipment and in the same manner with freshly prepared aluminum shavings etched with dilute HCl and then washed free of acid. The data obtained are presented in Table III.

Table III
DEHYDROFLUORINATION WITH ETCHED ALUMINUM

| Cumulative Time, Hour | Cumulative Vol. Treated/Vol. Catalyst | Space Velocity, liq. vol./vol. catalyst/hr. | F wt. percent | | | | Fluorine Removed, percent |
|---|---|---|---|---|---|---|---|
| | | | Before treatment | | After treatment | | |
| | | | Org.F | HF | Org.F | HF | |
| 17 | 30 | 0.9 | .0319 | .0010 | .0115 | .0118 | 64 |
| 142 | 187 | 2.9 | .0319 | .0010 | .0152 | .0208 | 52 |
| 284 | 440 | 2.4 | .0187 | .0000 | .0139 | .0002 | 25 |
| 351 | 623 | 2.6 | .0187 | .0000 | .0160 | .0047 | 14 |
| 404 | 725 | 2.8 | .0226 | .0000 | .0176 | .0044 | 22 |
| 487 | 950 | 2.5 | .0189 | .0000 | .0163 | .0044 | 14 |

Although this invention has been described with reference to alkylation in particular, and the examples have used particular catalysts, it is evident that the invention in general may be used in connection with various other processes for the removal of fluorine compounds from a fluid mixture. Furthermore, various modifications of equipment, process flow, and specific catalysts and the preparation thereof, will be obvious to those skilled in the art without departing from the scope of this invention.

The methods disclosed herein may be employed in the preparation of catalysts which are particularly adapted for use in the defluorinating of organic materials as described above. However, the catalysts of this invention are likewise adaptable to use in various other chemical reactions, particularly those catalyzed by phosphorus pentoxide and/or metal phosphates including pyrophosphates, such as polymerization of unsaturated hydrocarbons, and others described hereinbelow.

Unsaturated hydrocarbons, particularly the $C_2$ to $C_4$ gaseous olefins, may be polymerized by passing same in contact with my catalysts at temperatures within the range of 250 to 650° F., and at superatmospheric pressures preferably from 200 to 1000 pounds per square inch. Flow rates are chosen to give the desired extent of polymerization, and generally range from 1 to 10 liquid volumes feed per volume of catalyst per hour or 50 to 6000 volumes of gas per volume of catalyst per hour. The reaction mixture may consist of a single pure olefin or a mixture of olefins, but will preferably also contain inert diluents such as light paraffin hydrocarbons. A mixture of isobutylene with normal butylenes and butane may be subjected to co-polymerization, for example. A somewhat related operation involves the stabilization of a cracked gasoline against gum formation by treatment with my catalysts at 100 to 300° F. and 0 to 300 p. s. i., effecting polymerization of diolefins and other highly unsaturated materials while leaving the desired mono-olefins relatively unaffected.

The alkylation of aromatic hydrocarbons may also be effected, employing the catalysts of the present invention. Thus, benzene, toluene or naphthalene may be reacted with a methylating agent such as methyl alcohol or dimethyl ether at 300° to 500° C. and a pressure of 1 to 300 atmospheres with a contact time which will vary from 1 to 100 minutes, depending upon the temperature and other reaction conditions, the longer contact times being employed with the lower temperature and vice-versa. At least one mol of the aromatic hydrocarbon per mol of methylating agent should be employed, and preferably the former is in considerable excess over the latter. Other alkylating agents, particularly ethylene and higher olefins, are effective to produce the corresponding alkylated aromatic hydrocarbons. The mono-alkyl derivative is formed to the greatest extent although di- and higher poly-alkyl derivatives are present in the reaction mixture to some extent, and may be made the predominant product if desired by increasing the contact time and/or decreasing the ratio of aromatic hydrocarbon to alkylating agent. As part of the same over-all process to form mono-alkyl aromatics, or as a separate process, polyalkyl aromatic hydrocarbons may be de-alkylated by reaction with benzene or other aromatic whereby alkyl groups are transferred from the polyalkyl aromatics to the latter. Preferably at least one mol of benzene per mol of poly-alkyl aromatic is employed and this quantity may range up to 10 mols per mol of poly-alkyl aromatic; temperatures of 300 to 600° C. and pressures of 1 to 200 atmospheres are suitable.

Other processes in which my catalysts find particular utility is in the dehydration of alcohols to form the corresponding olefins, in which an alcohol, preferably having from 2 to 5 carbon atoms per molecule, is contacted with the catalyst at 300 to 500° C. at about atmospheric pressure, employing a liquid space velocity from 1 to 25 volumes per volume of catalyst per hour. Conversely, olefins are hydrated to form the corresponding alcohols, as by passing one mol of olefin together with from 0.5 to 5 mols of steam over the catalyst at 100 to 300° C. and 20 to 100 atmospheres. A reaction time from 10 minutes to two hours is used, the exact time depending upon the reactivity of the olefin and the extent of conversion per pass desired, as well as the activity of the particular catalyst employed.

As another example of the utility of the catalysts of this invention, methane may be utilized to form methanol and formaldehyde as principal reaction products, by passing oxygen admixed with a molar excess of methane over the catalyst at 60 to 1000° F. at a pressure of 200 to 750 pounds per square inch.

In any of the foregoing conversion processes in which the catalyst becomes deactivated by deposition of carbonaceous material thereon, effective reactivation of the catalyst may be accomplished by stopping the flow of reactants thereover and passing an oxygen-containing gas through the catalyst mass at conditions of oxygen concentration and flow rate controlled to avoid excessive temperature in the catalyst whereby the carbonaceous matter is removed from the catalyst by oxidation and the catalyst put in condition for reuse. Other specific uses of the catalyst described and claimed herein will be apparent to one skilled in the art.

I claim:

1. A catalyst consisting essentially of at least one metal of the group consisting of Al, Cd, Zn, and Cu coated with a solid material obtained by calcining a mixture of an acid of the group consisting of oxygen-containing acids of phosphorus, chromic acid, and tungstic acid and the reaction product of said metal and said acid.

2. A catalyst according to claim 1 in which said acid is concentrated phosphoric acid.

3. A catalyst according to claim 1 in which said acid is chromic acid.

4. A catalyst according to claim 1 in which said acid is tungstic acid.

5. A method of preparing a catalyst which comprises contacting at least one metal of the group consisting of Al, Cd, Zn, and Cu with an excess of an acid of the group consisting of oxygen-containing acids of phosphorus, chromic acid, and tungstic acid for a time sufficient to effect substantial reaction between said acid and the surface of said particles, removing thus-treated particles from the bulk of said acid so that the particles are coated with the reaction product and the residual acid, and then calcining the so-removed particles to form said catalyst by forming a hard coat of reaction product on the metal.

6. A method of preparing a catalyst useful in decomposing organic fluorine compounds, which comprises contacting particles of aluminum metal with an excess of orthophosphoric acid until visible evolution of hydrogen subsides, separating the bulk of the excess acid so that the particles retain some residual acid, and calcining the resulting particles to form said catalyst by forming a hard coat of reaction product on the metal.

7. The method of claim 5 in which said metal is cadmium.

8. The method of claim 5 in which said metal is zinc.

9. The method of claim 5 in which said metal is copper.

10. The method of claim 5 in which said acid is an acid of phosphorus.

11. A method of preparing a catalyst which comprises reacting particles of aluminum with 75 per cent phosphoric acid in excess so that after evolution of hydrogen ceases, the aluminum is coated with acid and reaction product; and calcining the resulting aluminum coated with a mixture comprising the acid and aluminum phosphate at an elevated temperature so as to dehydrate and harden the coating.

12. A catalyst according to claim 1 in which the metal is aluminum.

13. A catalyst according to claim 1 in which the metal is aluminum, the acid used is 75 per cent phosphoric, and calcination is effected in the range of 500 to 700° F.

14. A catalyst consisting essentially of particles of at least one metal of the group consisting of Al, Cd, Zn, and Cu coated with a solid material obtained by calcining a mixture of an acid of the group consisting of oxygen-containing acids of phosphorus, chromic acid, and tungstic acid and the reaction product of said metal and said acid.

15. A catalyst consisting essentially of particles of at least one metal of the group consisting of Al, Cd, Zn, and Cu coated with a solid material obtained by calcining a mixture of a liquid oxygen-containing acid of phosphorus and the reaction product of the metal and said acid.

16. A catalyst according to claim 15 in which said acid is concentrated phosphoric acid.

17. A catalyst according to claim 16 in which said metal is Al.

18. A catalyst according to claim 16 in which said metal is Cd.

19. A catalyst according to claim 16 in which said metal is Zn.

20. A catalyst according to claim 16 in which said metal is Cu.

21. A method of preparing a catalyst which comprises contacting particles of a metal of the group consisting of Al, Cd, Zn, and Cu with an excess of an acid of the group consisting of oxygen-containing acids of phosphorus, chromic acid, and tungstic acid for a time sufficient to effect substantial reaction between said acid and the surface of said particles, removing thus-treated particles from the bulk of said acid so that the particles are coated with the reaction product and the residual acid, and then calcining the so-removed particles to form said catalyst by forming a hard coat of reaction product on the metal.

22. A method of preparing a catalyst useful in decomposing organic fluorine compounds, which comprises contacting particles of a metal of the group consisting of Al, Cd, Zn, and Cu with an excess of orthophosphoric acid until visible evolution of hydrogen subsides, separating the bulk of the excess acid so that the particles retain some residual acid, and calcining the resulting particles to form said catalyst by forming a hard coat of reaction product on the metal.

JACK F. EBERLE.

References Cited in the file of this patent

UNITED STATES PATENTS

| Number | Name | Date |
|---|---|---|
| 2,199,180 | Laughlin | Apr. 30, 1940 |
| 2,339,929 | Houghton | Jan. 25, 1944 |
| 2,364,970 | Gwynn | Dec. 12, 1944 |
| 2,434,850 | Hochwalt et al. | Jan. 20, 1948 |
| 2,434,888 | Rust et al. | Jan. 20, 1948 |
| 2,462,938 | Bludworth et al. | Mar. 1, 1949 |
| 2,467,484 | Kanhofer | Apr. 19, 1949 |
| 2,501,846 | Gifford | Mar. 28, 1950 |
| 2,525,107 | Whiting et al. | Oct. 10, 1950 |